(12) United States Patent
Cho et al.

(10) Patent No.: US 11,029,222 B2
(45) Date of Patent: Jun. 8, 2021

(54) PRESSURE SENSOR HAVING CONDUCTIVE MATERIAL EXTENDING BETWEEN NON-POROUS AND POROUS REGIONS AND PRESSURE SENSING DEVICE COMPRISING SAME

(71) Applicant: LG INNOTEK CO., LTD., Seoul (KR)

(72) Inventors: Won Keun Cho, Seoul (KR); Eun Jin Kim, Seoul (KR); Soo Min Lee, Seoul (KR); Jina Lee, Seoul (KR); In Hee Cho, Seoul (KR); Hyun Jin Jo, Seoul (KR); Sanga Ju, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/313,110

(22) PCT Filed: Jul. 11, 2016

(86) PCT No.: PCT/KR2016/007493
§ 371 (c)(1),
(2) Date: Dec. 24, 2018

(87) PCT Pub. No.: WO2018/004049
PCT Pub. Date: Jan. 4, 2018

(65) Prior Publication Data
US 2019/0219460 A1    Jul. 18, 2019

(30) Foreign Application Priority Data
Jun. 30, 2016 (KR) .................. 10-2016-0082982

(51) Int. Cl.
*G01L 1/00* (2006.01)
*G01L 1/20* (2006.01)
(Continued)

(52) U.S. Cl.
CPC .................. *G01L 1/20* (2013.01); *G01L 1/18* (2013.01); *G01L 1/2287* (2013.01)

(58) Field of Classification Search
CPC ......... G01L 1/142; G01L 1/146; G01L 1/148; G01L 1/16; G01L 1/18; G01L 1/205;
(Continued)

(56) References Cited

U.S. PATENT DOCUMENTS 3,398,233 A * 8/1968 Otano ...................... H01B 1/00
174/110 R
4,258,100 A * 3/1981 Fujitani ................ B23K 35/226
428/316.6

(Continued)

FOREIGN PATENT DOCUMENTS

| JP | 2010-101827 | 5/2010 |
| KR | 10-2015-0007855 | 1/2015 |
| WO | WO 2016/010894 | 1/2016 |

OTHER PUBLICATIONS

International Search Report (with English Translation) and Written Opinion dated Mar. 20, 2017 issued in Application No. PCT/KR2016/007493.

*Primary Examiner* — Tran M. Tran
(74) *Attorney, Agent, or Firm* — Ked & Associates, LLP

(57) ABSTRACT

A pressure sensor comprises: a first electrode layer; a second electrode layer; and an intermediate layer disposed between the first electrode layer and the second electrode layer, wherein the intermediate layer changes in resistance, depending on a change in at least one of a thickness or a volume thereof. In addition, the intermediate layer comprises: a foam having porous regions dispersed in a non-porous region thereof; and a conductive material being dispersed in the foam and being more conductive than the foam.

20 Claims, 13 Drawing Sheets

(51) Int. Cl.
    *G01L 1/18*     (2006.01)
    *G01L 1/22*     (2006.01)

(58) Field of Classification Search
    CPC ....... G01L 9/0072; G01L 9/0005; G01L 9/12;
            G01L 9/0052; H01L 41/1132; H01L
            41/183; H01L 41/37; H01H 2001/0084;
            H01H 1/029; H01H 1/38; H01H 1/027;
                  H01H 2003/007; H01H 3/141
    See application file for complete search history.

(56) References Cited

U.S. PATENT DOCUMENTS

| | | | | |
|---|---|---|---|---|
| 4,449,774 A * | 5/1984 | Takashi | ................ | B29C 70/025 439/590 |
| 4,876,419 A * | 10/1989 | Lodini | ................ | H01H 3/141 200/86 R |
| 4,876,420 A * | 10/1989 | Lodini | ................ | H01B 7/104 200/86 R |
| 4,900,497 A * | 2/1990 | Lodini | ................ | H01C 10/106 264/104 |
| 4,977,386 A * | 12/1990 | Lodini | ................ | B29C 70/58 264/104 |
| 5,060,527 A * | 10/1991 | Burgess | ................ | G01L 1/205 338/47 |
| 5,213,715 A * | 5/1993 | Patterson | ................ | C08K 9/10 252/511 |
| 5,431,571 A * | 7/1995 | Hanrahan | ........ | H01R 13/2414 174/88 R |
| 5,679,888 A * | 10/1997 | Tohda | ................ | B82Y 35/00 374/E7.03 |
| 5,695,859 A * | 12/1997 | Burgess | ................ | H01H 1/029 200/85 R |
| 5,828,289 A * | 10/1998 | Burgess | ................ | H01H 1/029 338/47 |
| 5,886,615 A * | 3/1999 | Burgess | ................ | H01H 1/029 200/86 R |
| 5,904,978 A * | 5/1999 | Hanrahan | ............ | C08K 3/0008 174/110 F |
| 5,910,355 A * | 6/1999 | Burgess | ................ | H01H 1/029 200/84 B |
| 5,962,118 A * | 10/1999 | Burgess | ................ | H01H 1/029 252/503 |
| 6,072,130 A * | 6/2000 | Burgess | ................ | H01H 1/029 200/86 R |
| 6,114,645 A * | 9/2000 | Burgess | ................ | H01H 1/029 200/512 |
| 6,210,789 B1 * | 4/2001 | Hanrahan | ................ | H01B 1/22 428/324 |
| 6,238,599 B1 * | 5/2001 | Gelorme | ................ | H01B 1/22 252/512 |
| 6,452,479 B1 * | 9/2002 | Sandbach | ................ | G06F 3/045 338/101 |
| 6,501,463 B1 * | 12/2002 | Dahley | ................ | G01L 1/205 345/156 |
| 6,534,430 B2 * | 3/2003 | Makino | ................ | C04B 35/488 501/103 |
| 6,646,540 B1 * | 11/2003 | Lussey | ................ | H01C 10/106 338/114 |
| 6,714,117 B2 * | 3/2004 | Sandbach | ............... | G06F 3/045 114/210 |
| 6,724,195 B2 * | 4/2004 | Lurtz | ..................... | G01K 7/223 200/85 R |
| 6,809,280 B2 * | 10/2004 | Divigalpitiya | ......... | H01H 1/029 200/5 A |
| 6,835,889 B2 * | 12/2004 | Hiraoka | .................. | H01C 7/00 174/521 |
| 6,888,537 B2 * | 5/2005 | Benson | ................. | G06F 3/0414 345/156 |
| 7,260,999 B2 * | 8/2007 | Divigalpitiya | ......... | H01H 1/029 73/774 |
| 7,443,082 B2 * | 10/2008 | Grumm | ................ | A61B 5/4818 310/339 |
| 7,594,442 B2 * | 9/2009 | Kaiserman | ............. | B60N 2/002 73/760 |
| 7,703,333 B2 * | 4/2010 | Hayakawa | ............... | G01L 1/20 73/777 |
| 8,089,336 B2 * | 1/2012 | Burkitt | .................. | G06F 3/0202 338/101 |
| 8,253,696 B2 * | 8/2012 | Antaki | ................. | G06K 9/0002 178/18.06 |
| 8,363,028 B2 * | 1/2013 | Antaki | ................ | G06K 9/0002 345/173 |
| 8,371,174 B2 * | 2/2013 | Chen | ..................... | G01L 9/0052 361/283.4 |
| 8,471,719 B2 * | 6/2013 | Hu | ..................... | H03K 17/9625 340/657 |
| 8,514,088 B2 * | 8/2013 | Hu | ........................ | H03K 17/94 340/584 |
| 8,558,434 B2 * | 10/2013 | Suda | ..................... | F03G 7/005 310/363 |
| 8,570,641 B2 * | 10/2013 | Hayashi | ............. | B29D 11/0073 359/290 |
| 8,669,755 B2 * | 3/2014 | Kato | ..................... | G01B 7/287 204/406 |
| 8,984,954 B2 * | 3/2015 | Merrell | ..................... | G01L 1/16 73/777 |
| 9,448,127 B2 * | 9/2016 | Cannard | .................. | G01L 1/18 |
| 9,743,712 B2 * | 8/2017 | Orand | .................. | A43B 13/188 |
| 9,857,246 B2 * | 1/2018 | Bowden | .................. | G01B 7/18 |
| 9,904,393 B2 * | 2/2018 | Frey | ...................... | G06F 3/0414 |
| 10,260,968 B2 * | 4/2019 | Merrell | ..................... | G01L 1/04 |
| 10,263,174 B2 * | 4/2019 | Merrell | ..................... | G01L 1/16 |
| 10,401,238 B2 * | 9/2019 | Bonifas | .................. | G01L 1/14 |
| 10,418,145 B2 * | 9/2019 | Lessing | .................... | H01F 7/02 |
| 2003/0213939 A1 * | 11/2003 | Narayan | ................ | B82Y 10/00 252/500 |
| 2009/0002201 A1 * | 1/2009 | Crowley | ................ | G06F 3/0202 341/22 |
| 2014/0090489 A1 | 4/2014 | Taylor | | |
| 2017/0199095 A1 | 7/2017 | Shere et al. | | |
| 2018/0198129 A1 * | 7/2018 | Kim | ...................... | H01M 4/625 |
| 2018/0326456 A1 * | 11/2018 | Park | ..................... | B06B 1/0603 |

* cited by examiner

PRESSURE SENSOR HAVING CONDUCTIVE MATERIAL EXTENDING BETWEEN NON-POROUS AND POROUS REGIONS AND PRESSURE SENSING DEVICE COMPRISING SAME

CROSS-REFERENCE TO RELATED PATENT APPLICATIONS

This application is a U.S. National Stage Application under 35 U.S.C. § 371 of PCT Application No. PCT/KR2016/007493, filed Jul. 11, 2016, which claims priority to Korean Patent Application No. 10-2016-0082982, filed Jun. 30, 2016, whose entire disclosures are hereby incorporated by reference.

TECHNICAL FIELD

The present invention relates to a pressure sensor, and more specifically, to a sensor and device for sensing a pressure.

BACKGROUND ART

A device for sensing a pressure in various application fields using a pressure from a body, as well as a safety device for home use, is required.

A pressure sensing device includes a lower electrode, an intermediate layer disposed on the lower electrode, and an upper electrode disposed on the intermediate layer. The intermediate layer has elasticity and may include a conductive filler. The performance of the pressure sensing device may be influenced by the elastic restoring force and conduction performance of the intermediate layer.

Generally, the intermediate layer may be manufactured through a process of immersing an elastic foam in a conductive solution and cleaning and drying the foam. In this case, when the pressure sensing device is repeatedly used, the conductive filler attached to a surface of the elastic foam may be detached, and the detached conductive filler may become a surrounding pollution source and may cause sensitivity degradation of the pressure sensing device.

Further, when the conductive solution includes an adhesive to attach the conductive filler to a surface of the foam, the elastic restoring force of the intermediate layer may be degraded.

Technical Problem

The present invention is directed to providing a pressure sensing device for sensing a pressure according to an applied weight.

Technical Solution

One aspect of the present invention provides a pressure sensor which includes a first electrode layer, a second electrode layer, and an intermediate layer disposed between the first electrode layer and the second electrode layer, wherein the intermediate layer includes a foam in which a porous region is dispersed in a non-porous region and a conductive material dispersed in the foam and having a conductivity rate that is higher than that of the foam.

At least a part of the conductive material may be dispersed in the non-porous region.

The at least a part of the conductive material may pass through an interface between the non-porous region and the porous region.

The at least a part of the conductive material may be dispersed in the porous region.

A ratio of the porous region in the foam to the foam may be in a range of 5 to 90%.

A resistance of the intermediate layer may be changed according to change in at least one of a thickness and a volume of the intermediate layer.

The foam may be selected from the group consisting of polyurethane, polyolefin, rubber, silicone, and elastomer.

The conductive material may be selected from the group consisting of Au, Ag, Cu, Ni, carbon nano tube (CNT), carbon black, graphene, a ceramic material, and a conductive polymer.

Each of the first electrode layer and the second electrode layer may be made of a conductive fiber.

Another aspect of the present invention provides a pressure sensor which includes a first electrode layer, a second electrode layer disposed to be spaced apart from the first electrode layer on a horizontal surface, and an intermediate layer disposed on or under the first electrode layer and the second electrode layer, wherein the intermediate layer includes a foam in which a porous region is disposed in a non-porous region and includes a conductive material dispersed in the foam and having a conductivity rate that is higher than that of the foam.

Still another aspect of the present invention provides a pressure sensing device which includes a pressure sensor, a signal processing unit connected with the pressure sensor and configured to process an electric signal generated by the pressure sensor, and a control unit connected with the signal processing unit and configured to generate a control signal based on a signal processed by the signal processing unit, wherein the pressure sensor includes a first electrode layer, a second electrode layer, and an intermediate layer disposed between the first electrode layer and the second electrode layer, wherein the intermediate layer includes a foam in which a porous region is dispersed in a non-porous region and a conductive material dispersed in the foam and having a conductivity rate that is higher than that of the foam.

Advantageous Effects

A pressure sensing device according to an embodiment of the present invention can precisely detect a pressure caused according to an applied weight and can precisely detect pressure distribution.

Particularly, according to an embodiment of the present invention, detachment of a conductive filler is minimized, and thus a pressure sensing device with high elastic restoring force and high durability can be obtained. Further, according to the embodiment of the present invention, a manufacturing process can be simplified.

MODES OF THE INVENTION

Figure 1:
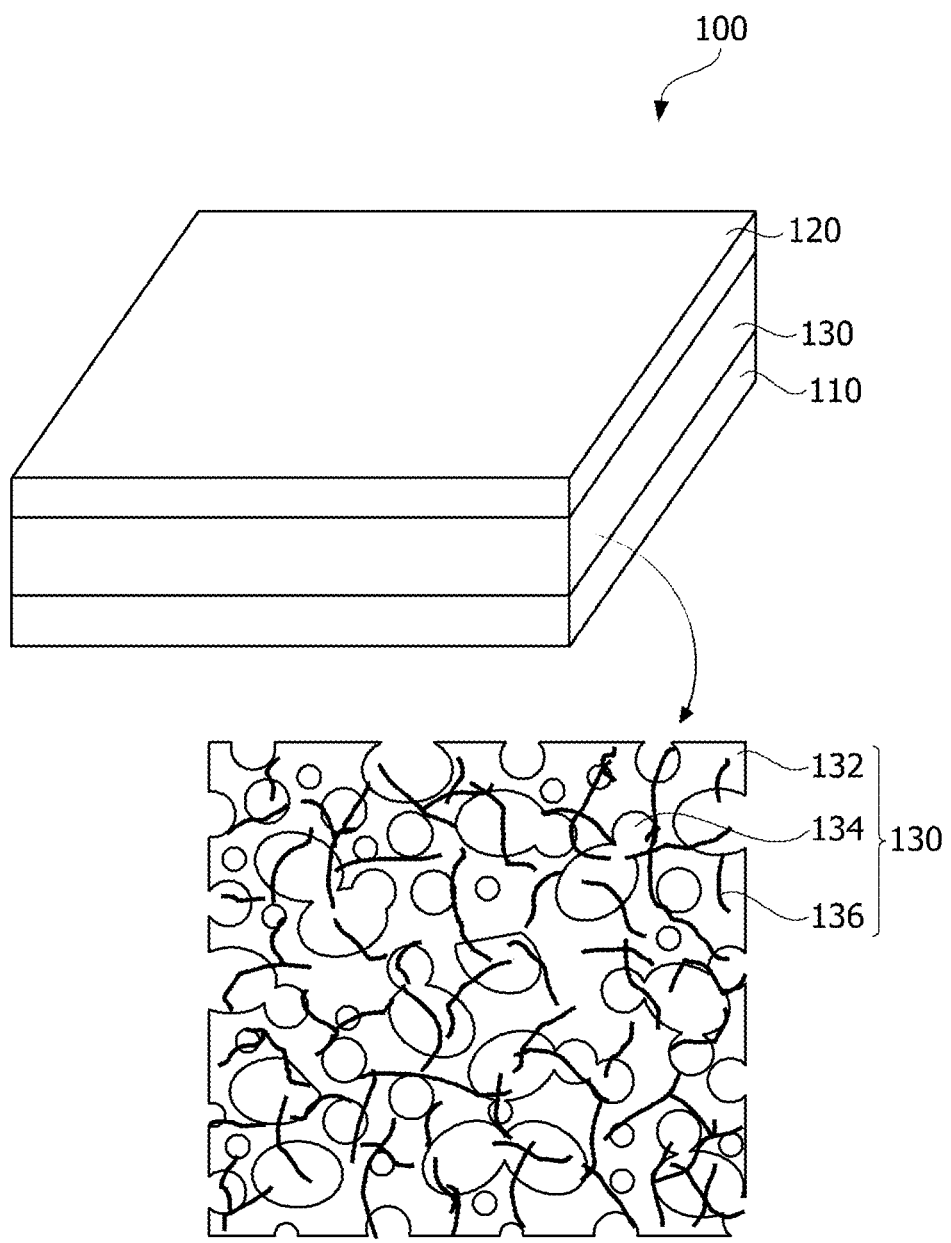
FIG. 1 is a perspective view of a pressure sensor according to one embodiment of the present invention.

While the present invention is susceptible to various modifications and alternative forms, specific embodiments thereof will be shown by way of example in the drawings and described in detail therein. It should be understood, however, that there is no intent to limit the present invention to the particular forms disclosed, but on the contrary, the present invention is to cover all modifications, equivalents, and alternatives falling within the spirit and scope of the present invention.

It will be understood that, although the terms "first," "second," etc. may be used herein to describe various elements, these elements should not be limited to these terms. These terms are only used to distinguish one element from another. For example, a first element could be termed a second element, and similarly, a second element could be also termed a first element without departing from the scope of the present invention. As used herein, the term "and/or" includes any and all combinations of one or more of the associated listed items.

It will be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements present.

The terminology used herein is for the purpose of describing particular embodiments only and is not intended to be limiting of the present invention. The singular forms "a" and "an" are intended to include the plural forms as well, unless the context clearly indicates otherwise. In the present invention, it will be further understood that the terms "comprise," "comprising," "include," and/or "including," when used in this specification, specify the presence of stated features, integers, steps, operations, elements, components and/or groups thereof, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be described in detail with reference to the accompanying drawings. The same reference numerals will be used to describe the same or like components, and a redundant description thereof will be omitted.

Figure 2:
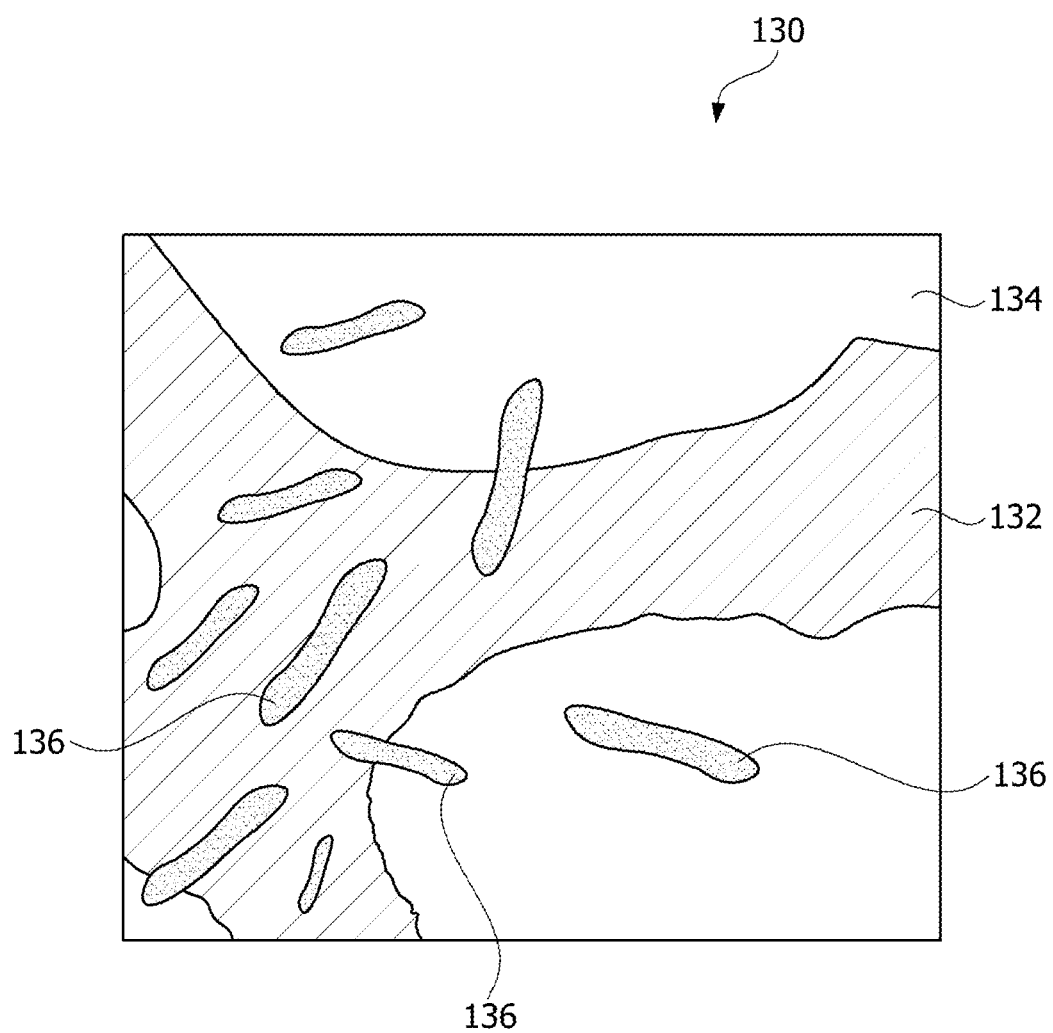
FIG. 2 is an enlarged view of an intermediate layer of the pressure sensor according to one embodiment of the present invention.

FIG. 1 is a perspective view of a pressure sensor according to one embodiment of the present invention, and FIG. 2 is an enlarged view of an intermediate layer of the pressure sensor according to one embodiment of the present invention.

Referring to FIGS. 1 and 2, a pressure sensor 100 includes a first electrode layer 110, a second electrode layer 120, and an intermediate layer 130 disposed between the first electrode layer 110 and the second electrode layer 120.

For example, the first electrode layer 110 and the second electrode layer 120 are made of fabric and may be made of fabric including conductive fiber. In this case, the conductive fiber may be a metal wire or general fiber of which the surface is covered with a metal film. The conductive fiber may be a general fiber in which metal particles are dispersed. When the conductive fiber is a metal wire, a diameter of the metal wire may be in a range of 10 to 500 µm. When the diameter of the metal wire is less than 10 µm, it may be hard to process the fabric due to a low strength of the metal wire, and when the diameter of the metal wire is greater than 500 µm, the flexibility of the fabric is decreased due to high stiffness of the metal wire, and thus equipment may be damaged when fabric is processed, and a user may easily feel a sense of difference. In this case, the metal wire may be made of Cu, Ni, or a stainless alloy. For example, the stainless alloy may be a martensitic stainless alloy, a ferrite-based stainless alloy, an austenite-based stainless alloy, a two-phase-based stainless alloy, a precipitation hardening-based stainless alloy, or the like. When the metal wire is made of a stainless alloy, a corrosion resistance of the pressure sensor 100 can be increased.

When the conductive fiber is general fiber of which the surface is covered with a metal film, the metal film may be formed by a method of covering a surface of the general fiber with metal particles in a plating method or a deposition method. In this case, the metal particles may be Cu, Ni, or a stainless alloy, and a thickness of metal film may be in a range of 1 to 50 µm. When a thickness of the metal film is less than 1 µm, a loss may be caused due to a low conductivity rate when a signal is transferred, and, when a thickness of metal film is greater than 50 µm, the metal film is easily detached from a surface of the fiber.

For another example, the first electrode layer 110 and the second electrode layer 120 may be a plating electrode or a printing electrode and may be a flexible and elastic electrode.

In this case, the first electrode layer 110 and the second electrode layer 120 may be formed in different directions from each other, and a crossing point may act as one sensing point. Therefore, when the sensing point is pressurized, a gap between the first electrode layer 110 and the second electrode layer 120, that is, a thickness of intermediate layer 130, is decreased. As applying force is increased, the thickness of intermediate layer 130 is decreased, and a piezo resistance is lowered. Therefore, the pressure sensor 100 according to the embodiment of the present invention may detect a weight according to a change in piezo resistance.

Although not shown, the first electrode layer 110 may be formed to be larger than the second electrode layer 120.

Meanwhile, the intermediate layer 130 includes a foam in which porous regions 134 are dispersed in a non-porous region 132 and a conductive material 136 dispersed in the foam and having a conductivity rate that is higher than that of the foam.

In this case, the non-porous region 132 of the foam may include at least one selected from the group consisting of polyurethane, polyolefin, rubber, silicone, and elastomer. When the porous regions 134 are dispersed in the non-porous region 132 of the foam, the intermediate layer 130 may include elasticity. Therefore, when a pressure is applied to a point at which the first electrode layer 110 and the second electrode layer 120 cross each other, a thickness of intermediate layer 130 is decreased, and a piezo resistance is changed. In this case, the porous regions 134 may be dispersed in the non-porous region 132 of the foam.

In this case, a ratio of the porous regions 134 to the foam may be in a range of 5% to 90%. When the ratio of the porous regions 134 to the foam is less than 5%, deformation of thickness is small, and thus a change in piezo-resistance is not measured, or weight detection recognition is hard. When the ratio of the porous regions 134 to the foam is greater than 90%, the elastic restoring force of the foam is degraded, and thus the performance of the pressure sensor is not secured.

Further, the conductive material 136 in the foam may be selected from the group consisting of Au, Ag, Cu, Ni, carbon nano tubes (CNTs), carbon black, graphene, a ceramic material, and a conductive polymer. In this case, the conductive polymer may include polyaniline or polypyrrole. The ceramic material may be, for example, micro carbon coil barium titanate with a diameter of less than or equal to 100 μm. Therefore, the intermediate layer 130 has an insulation performance having a resistance of greater than or equal to 1 kΩ in a normal state, but when a physical change around the intermediate layer 130 is caused, or a pressure is applied to the intermediate layer 130, a resistance is changed by a change in any one of a thickness and volume of the intermediate layer 130.

In this case, the conductive material 136 may be included in an amount of 1 to 10 wt % of the foam. When the conductive material 136 is included in an amount of less than 1 wt % of the foam, piezo resistance may be caused to be insensitive to change when a pressure is applied. Further, when the conductive material 136 is included in an amount of greater than 10 wt % of the foam, it is hard to secure the insulation performance of the intermediate layer 130 in a state in which a pressure is not applied.

At least a part of the conductive material 136 is dispersed in the non-porous region 132, is dispersed to pass through an interface between the non-porous region 132 and the porous region 134, or is dispersed in the porous region 134. Therefore, when the conductive material 136 is dispersed in the non-porous region 132 or dispersed to pass through an interface between the non-porous region 132 and the porous region 134, the conductive material 136 may be fixed to the inside of the foam. Therefore, even when the pressure sensor 100 is repeatedly used for a long period of time, a possibility of the conductive material 136 being detached from the foam may be decreased.

In this case, a ratio of conductive materials dispersed in the non-porous region 132 or dispersed to pass through an interface between the non-porous region 132 and the porous region 134 to all conductive materials may be greater than or equal to 50 wt %. When the ratio of conductive materials dispersed in the non-porous region 132 or dispersed to pass through an interface between the non-porous region 132 and the porous region 134 to all conductive materials is less than 50 wt %, pollution may occur due to detachment of the conductive material, or sensitivity to a resistance change may be degraded.

Figure 3:
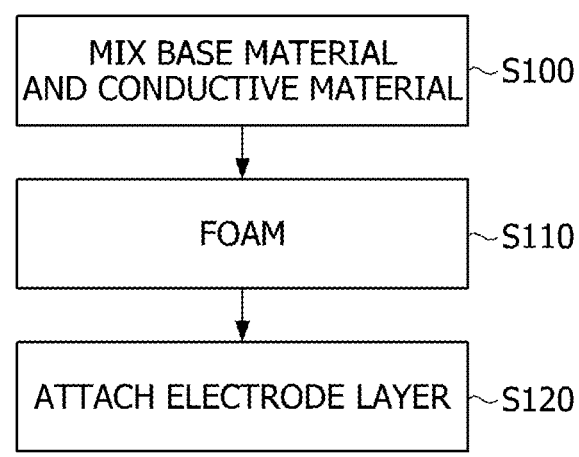
FIG. 3 is a flowchart showing a method of manufacturing the pressure sensor according to one embodiment of the present invention.

FIG. 3 is a flowchart showing a method of manufacturing the pressure sensor according to one embodiment of the present invention.

Referring to FIG. 3, the foam and the conductive material are mixed (S100). In this case, the foam may include at least one selected from the group consisting of polyurethane, polyolefin, rubber, silicone, and elastomer, and the conductive material may be selected from the group consisting of Au, Ag, Cu, Ni, CNTs, carbon black, a ceramic material, and a conductive polymer. In this case, the conductive material may be included in an amount of 1 to 10 wt % of the foam.

The mixed foam and conductive material is foam-molded to form an intermediate layer (S110). Therefore, the foam may be divided into the non-porous region and the porous region, and the conductive material is dispersed in the non-porous region or dispersed to pass through an interface between the non-porous region and the porous region.

Next, an electrode layer is attached to the intermediate layer (S120). For example, a first electrode layer may be attached to one surface of the intermediate layer, and a second electrode layer may be attached to the other surface of the intermediate layer. In this case, the intermediate layer, the first electrode layer, and the second electrode layer may be attached by an adhesive layer. The adhesive layer may be an insulating adhesive layer including an insulating material.

Figure 4:
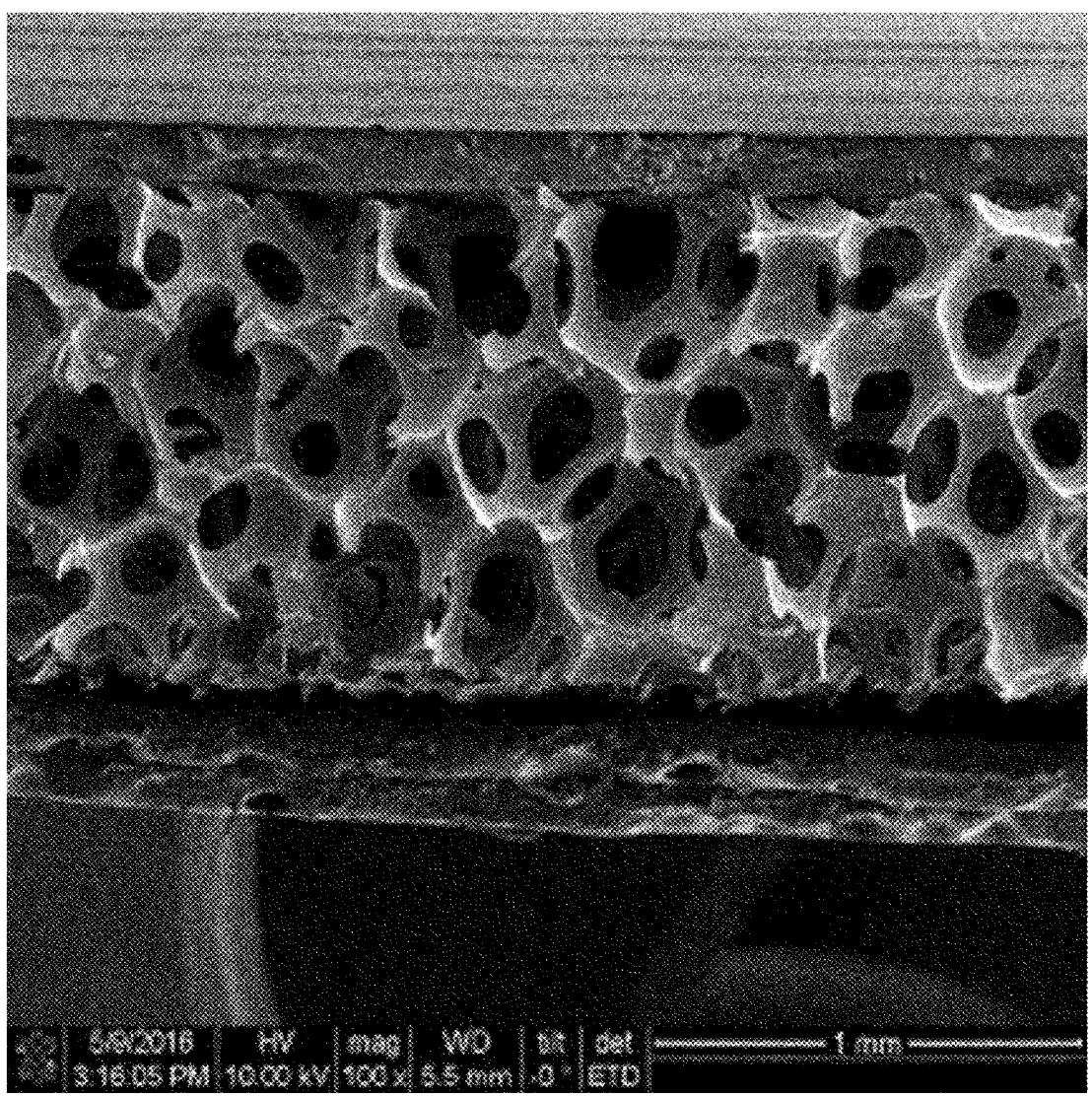
FIGS. 4 and 5 are scanning electron microscope (SEM) images of an intermediate layer manufactured according to a comparative example.
Figure 5:
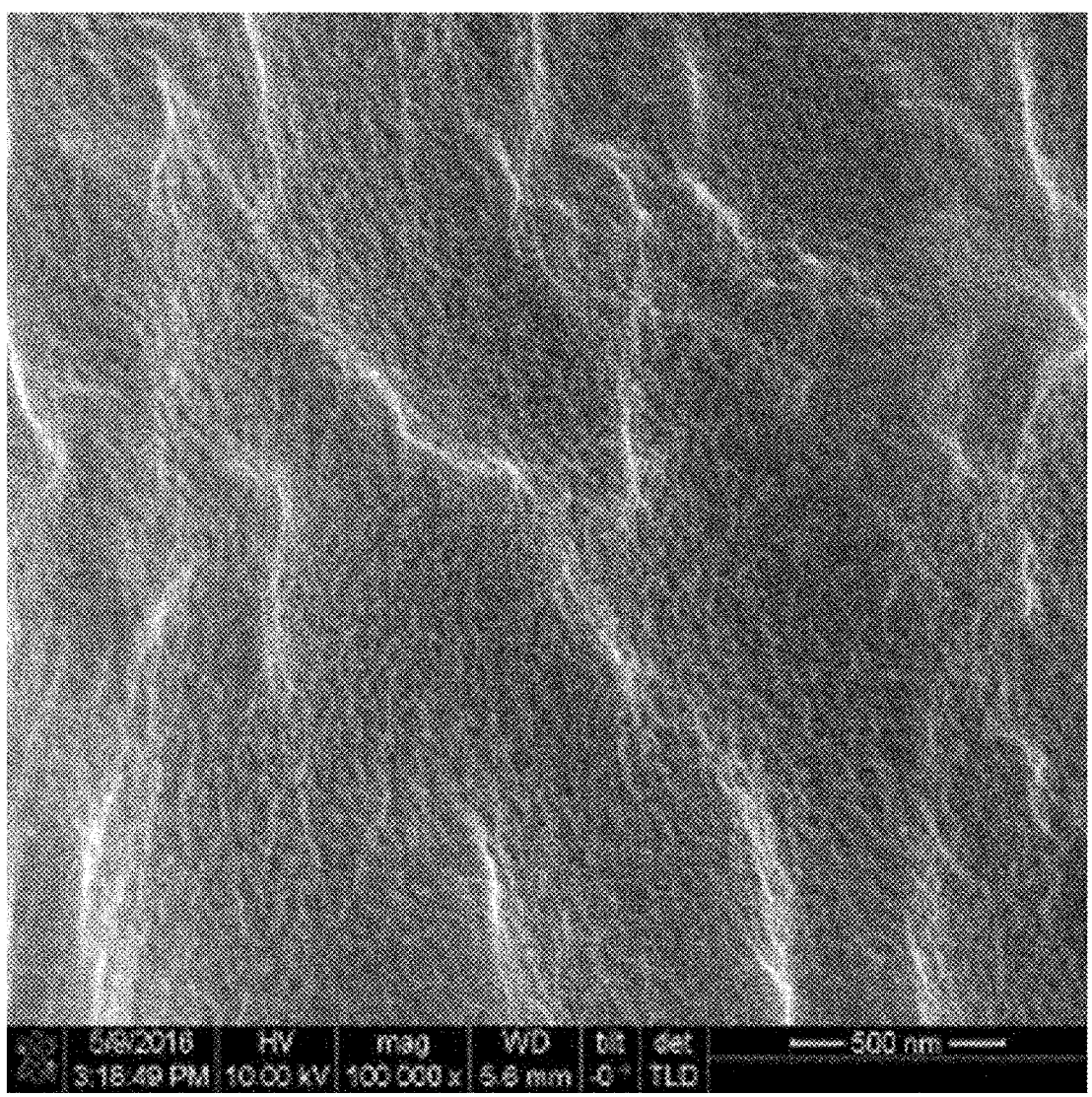
Figure 6:
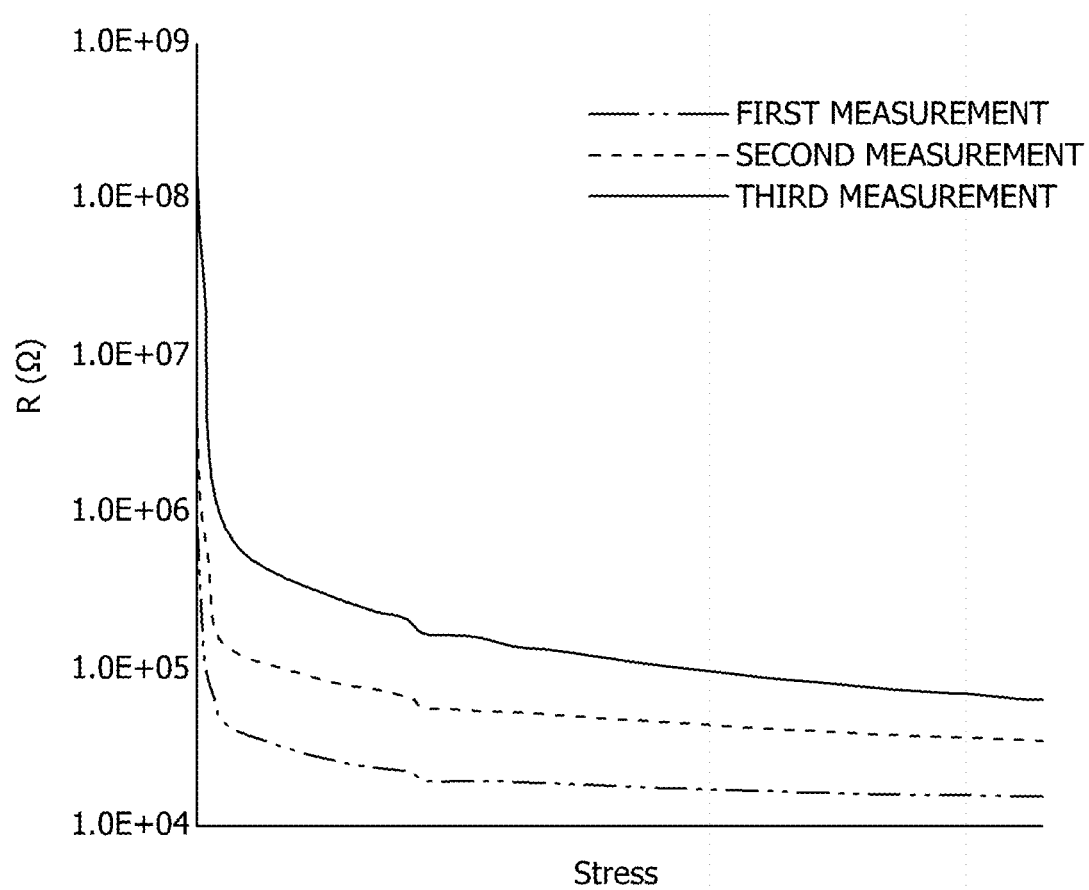
FIG. 6 is a graph showing a change in resistance of the intermediate layer shown in FIGS. 4 and 5.
Figure 7:
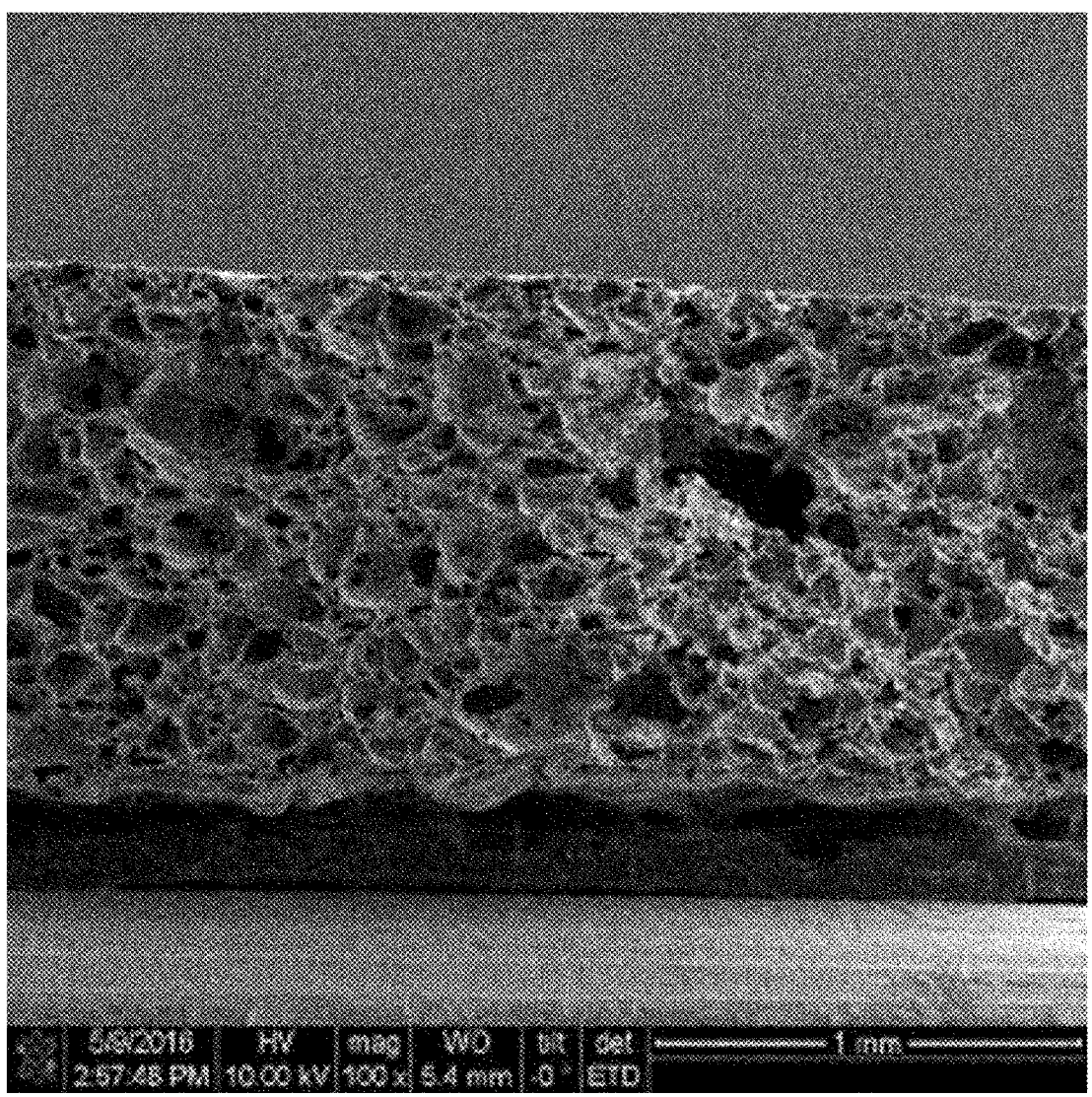
FIGS. 7 to 8 are SEM images of an intermediate layer manufactured according to one embodiment of the present invention.
Figure 8:
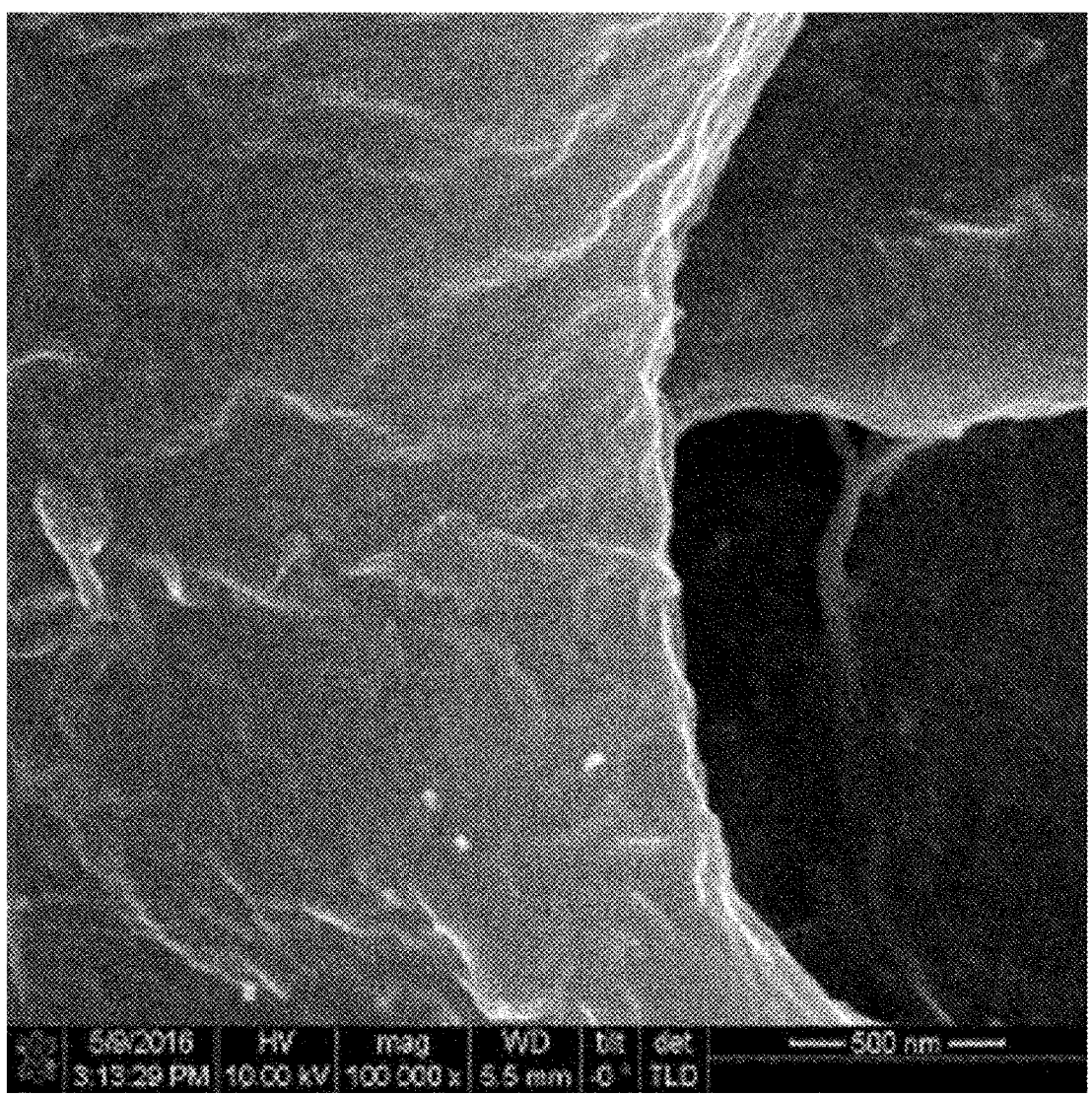
Figure 9:
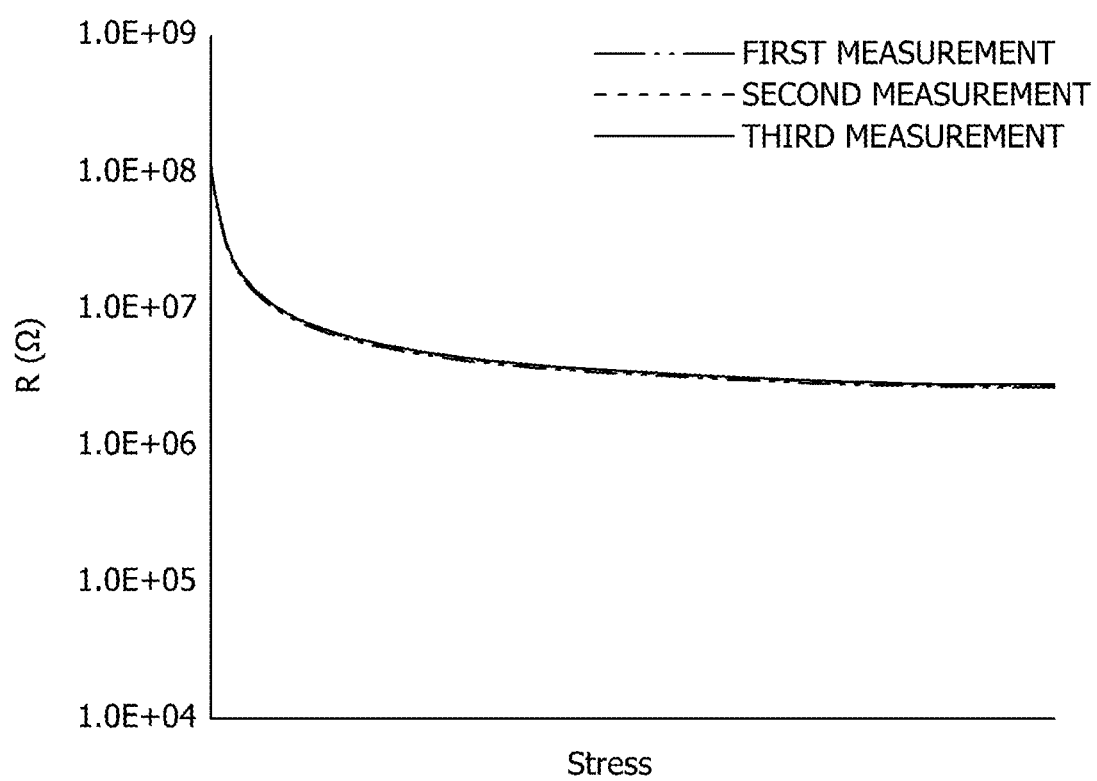
FIG. 9 is a graph showing a change in resistance of the intermediate layer shown in FIGS. 7 and 8.

FIGS. 4 and 5 are scanning electron microscope (SEM) images of an intermediate layer manufactured according to a comparative example, FIG. 6 is a graph showing a change in resistance of the intermediate layer shown in FIGS. 4 and 5, FIGS. 7 to 8 are SEM images of an intermediate layer manufactured according to one embodiment of the present invention, and FIG. 9 is a graph showing a change in resistance of the intermediate layer shown in FIGS. 7 and 8.

In the comparative example, an intermediate layer was manufactured by a method in which a foam was foam-molded and was immerged in a solution including a conductive material.

In the embodiment, an intermediate layer was manufactured by a method in which a foam and a conductive material were mixed and foam-molded.

The foams used in the comparative example and the embodiment were polyurethane, the conductive materials were CNTs, and the conductive materials were added in an amount of 0.05 to 3 wt % of all conductive materials.

Resistance changes of the intermediate layer were repeatedly measured by performing a process of increasing a pressure from 0 to 1000 kPa at least three times.

Referring to FIGS. 4, 5, 7, and 8, a film made of a conductive material was formed on a surface of the non-porous region of the intermediate layer manufactured according to the comparative example, but the conductive material was partially buried in the surface of the non-porous region of the intermediate layer manufactured according to the embodiment. According to the comparative example, the foam was foam-molded and immerged in a conductive solution, and thus most of the conductive materials were attached to a surface of the non-porous region of the foam. On the contrary, according to the embodiment, the foam and the conductive material were mixed and foam-molded, and thus the conductive materials were dispersed in the non-porous region or dispersed to pass through an interface between the non-porous region and the porous region.

Further, referring to FIGS. 6 and 9, the intermediate layer manufactured according to the comparative example had resistance values which increased from first pressurization toward third pressurization, but the intermediate layer manufactured according to the embodiment had similar resistance values in the first, second, and third pressurization. Therefore, it can be confirmed that the repeatability and reproducibility of the intermediate layer manufactured according to the embodiment was higher than the repeatability and reproducibility of the intermediate layer manufactured according to the comparative example.

Further, even when the intermediate layer manufactured according to the comparative example and the intermediate layer manufactured according to the embodiment used the same kinds and content of foams and the same kinds and content of conductive materials, it can be confirmed that an initial resistance of the intermediate layer manufactured according to the embodiment was higher than an initial resistance of the intermediate layer manufactured according to the comparative example. As the initial resistance was high, an insulation performance in a state in which a pressure was not applied was excellent, and current consumption of a sensor could be decreased.

Figure 10:
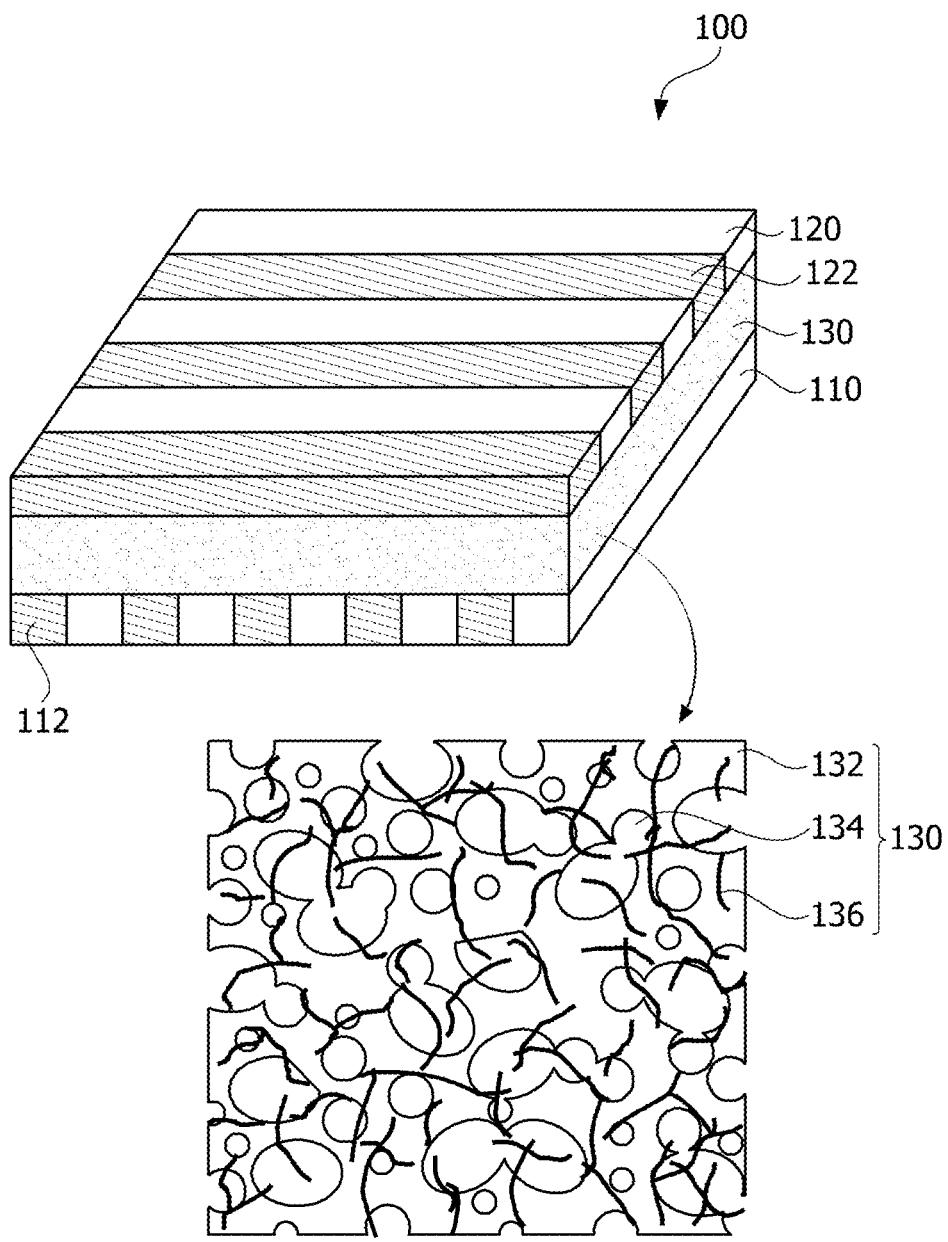
FIG. 10 is a perspective view of a pressure sensor according to one embodiment of the present invention.

FIG. 10 is a perspective view of a pressure sensor according to one embodiment of the present invention. The same descriptions as those in the first to third embodiments will be omitted.

Referring to FIG. 10, a pressure sensor 100 includes a first electrode layer 110 including a first conductive region 112, a second electrode layer 120 including a second conductive region 122, and an intermediate layer 130 disposed between the first electrode layer 110 and the second electrode layer 120.

As an example, the first electrode layer 110 and the second electrode layer 120 are made of fabric, and the first conductive region 112 and the second conductive region 122 may be made of fabric including conductive fiber.

In this case, the first conductive region 112 of the first electrode layer 110 and the second conductive region 122 of the second electrode layer 120 may be formed in different directions from each other, and a point at which the first conductive region 112 and the second conductive region 122 cross each other may act as one sensing point. Therefore, when the sensing point is pressurized, a gap between the first conductive region 112 and the second conductive region 122, that is, a thickness of the intermediate layer 130, is decreased. As applying force is increased, a thickness of the intermediate layer 130 is decreased, and a piezo resistance is lowered. Therefore, the present invention pressure sensor 100 according to the embodiment may detect a weight according to a change in piezo resistance.

Although not shown, the first conductive region 112 may be formed to be larger than the second conductive region 122, and a plurality of second conductive regions 122 may be disposed on one first conductive region 112.

In the above description, a structure in which the intermediate layer between the first electrode layer and the second electrode layer is formed has been mainly described, and the first electrode layer and the second electrode layer may be disposed to be coplanar.

Figure 11:
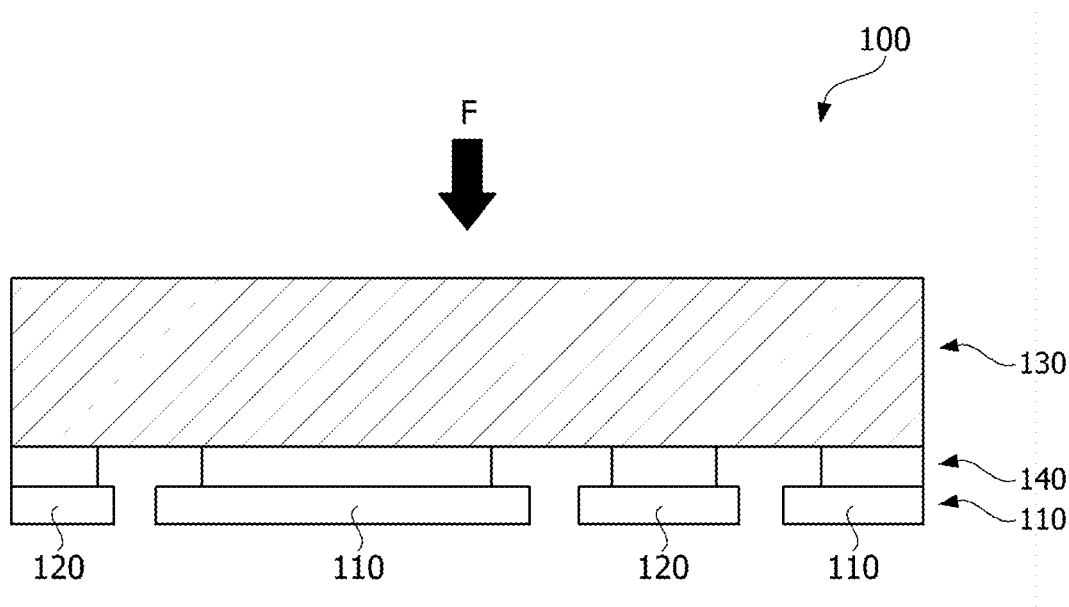
FIG. 11 is a cross-sectional view of a pressure sensor according to another embodiment of the present invention.

FIG. 11 is a cross-sectional view of a pressure sensor according to another embodiment of the present invention. The same descriptions as those in the first to third embodiments will be omitted.

Referring to FIG. 11, a pressure sensor 100 includes a first electrode layer 110 including a first conductive region, a second electrode layer 120 including a second conductive region, and an intermediate layer 130.

The second electrode layer 120 is disposed to be spaced apart from the first electrode layer 110 on a horizontal surface, and the intermediate layer 130 may be disposed on or under the first electrode layer 110 and the second electrode layer 120.

Therefore, a ground may be connected to one layer, and it is not necessary to install an additional ground electrode, and thus costs for materials of the pressure sensor 100 and manufacturing the pressure sensor 100 can be reduced, and a thickness of the pressure sensor 100 can be reduced.

Meanwhile, the first electrode layer 110 and the second electrode layer 120 may be attached to the intermediate layer 130 through an adhesive layer 140. In this case, the adhesive layer 140 includes an insulator and may be disposed on one area between the first electrode layer 110 and the intermediate layer 130 and on one area between the second electrode layer 120 and the intermediate layer 130.

Further, the adhesive layer 140 may be separately disposed in the same manner as the first electrode layer 110 and the second electrode layer 120. Further, the adhesive layer 140 may have a structure in which both surfaces of the film are coated with insulating adhesives.

When a pressure F is applied to the pressure sensor 100, a thickness of the elastic intermediate layer 130 is changed. Due to a change in thickness of the intermediate layer 130, the first electrode layer 110 and the second electrode layer 120 spaced apart from each other are connected to allow electricity to flow. A level of pressure may be detected based on a generated electric signal.

The pressure sensor according to the embodiment of the present invention may be included in the pressure sensing device.

Figure 12:
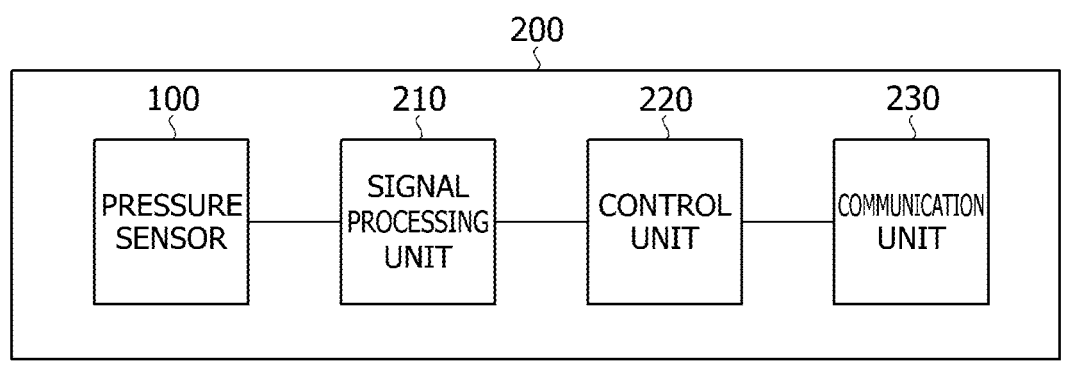
FIG. 12 is a block diagram of a pressure sensing device according to one embodiment of the present invention.

FIG. 12 is a block diagram of a pressure sensing device according to one embodiment of the present invention.

Referring to FIG. 12, a pressure sensing device 200 includes a pressure sensor 100, a signal processing unit 210, a control unit 220, and a communication unit 230. The pressure sensor 100 may generate an electric signal due to a resistance change caused by change in at least one of a thickness and a volume of the intermediate layer 130. Electric signals of the first electrode layer 110 and the second electrode layer 120 are transmitted to the signal processing unit 210. To this end, the first electrode layer 110, the second electrode layer 120, and the signal processing unit 210 may be connected by a flexible printed circuit board (FPCB).

The signal processing unit 210 processes the electric signals received from the first electrode layer 110 and the second electrode layer 120 and transmits the electric signals to the control unit 220, and the control unit 220 may generate a control signal based on a signal processed by the signal processing unit 210. For example, the control unit 220 may control the pressure sensing device 200 to turn on/off using a result obtained by processing a signal detected by the pressure sensor 100. For another example, the control unit 220 may generate diagnosis information using the result obtained by processing the signal detected by the pressure sensor 100. For still another example, the control unit 220 may generate an alarm signal and the like for a user using the result obtained by processing the signal detected by the pressure sensor 100.

Further, the communication unit 230 transmits a control signal generated by the control unit 220 to an external device.

In this case, the pressure sensor 100 is disposed in a separate space from the signal processing unit 210, the control unit 220, and the communication unit 230 and may be connected through the FPCB. Otherwise, the pressure sensor 100 is disposed in the same space as the signal processing unit 210, the control unit 220, and the communication unit 230 and may be connected through the FPCB.

The pressure sensor 100 according to the embodiment of the present invention may be applied to various application fields using body pressure distribution such as a pressure detection insole, a pressure detection grove, a pressure detecting mat, a pressure detecting chair, and the like.

Figure 13:
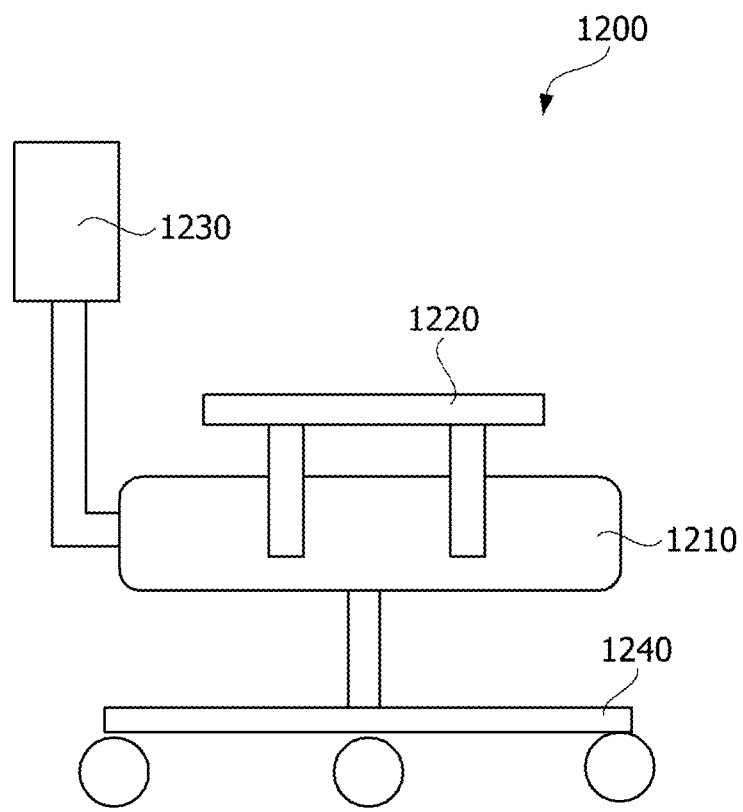
FIG. 13 shows an example in which the pressure sensing device according to one embodiment of the present invention is applied to a pressure sensing chair.

FIG. 13 shows an example in which the pressure sensing device according to one embodiment of the present invention is applied to a pressure sensing chair.

Referring to FIG. 13, a pressure sensing chair 1200 includes a seat 1210, an armrest 1220, a backrest 1230, a leg 1240, and the like. When a person is seated on the seat 1210, the pressure sensing device 200 embedded in the pressure sensing chair 1200 detects whether a user is seated and may measure relative pressure distribution according to seating of the user. The pressure sensing device 200 may detect a weight, an age group, and a sitting position, and the like according to the measured pressure distribution. The pressure sensor 100 according to the embodiment of the present invention may be installed in the seat 1210.

Figure 14:
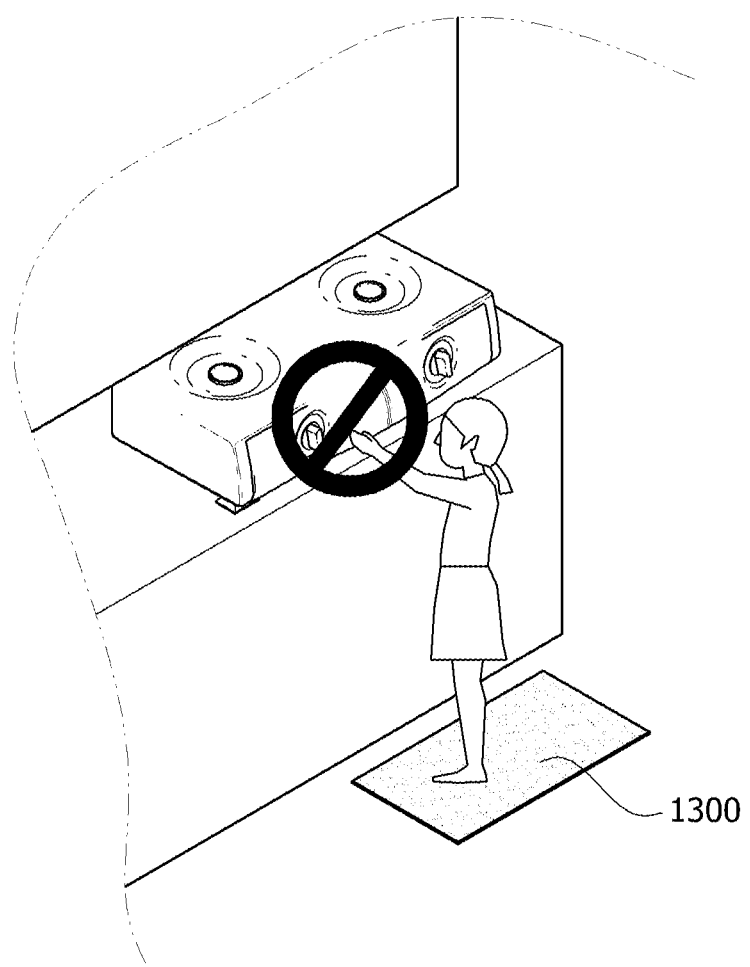
FIG. 14 shows an example in which the pressure sensing device according to one embodiment of the present invention is applied to a pressure sensing mat.

FIG. 14 shows an example in which the pressure sensing device according to one embodiment of the present invention is applied to a pressure sensing mat.

Referring to FIG. 14, the pressure sensor 100 is included in a mat 1300, and the signal processing unit 210, the control unit 220, and the communication unit 230 of the pressure sensing device 200 may be disposed in a separate space. When a child is on the mat 1300, the pressure sensor 100 included in the mat 1300 detects a change in piezo resistance, and the control unit 220 may measure a weight applied to the mat 1300 based on the detected change in piezo resistance. When the weight applied to the mat 1300 is estimated as a weight of the child, the control unit 220 locks an home appliance, a gas range, or the like around the mat or may generate a control signal for outputting an alarm.

While the present invention has been described with reference to the exemplary embodiments, it will be understood by those skilled in the art that various changes and modifications may be made without departing from the spirit and scope of the present invention as defined by the appended claims.

DESCRIPTION OF SYMBOLS

100: PRESSURE SENSOR
110: FIRST ELECTRODE LAYER
120: SECOND ELECTRODE LAYER
130: INTERMEDIATE LAYER
132: NON-POROUS REGION
134: POROUS REGION
136: CONDUCTIVE MATERIAL

The invention claimed is:

1. A pressure sensor comprising:
a first electrode layer;
a second electrode layer provided above the first electrode layer; and
an intermediate layer provided between the first electrode layer and the second electrode layer,
wherein the first electrode layer is larger than the second electrode layer, wherein the intermediate layer includes a foam in which a porous region is dispersed in a non-porous region, and a conductive material is dispersed in the foam and has a conductivity that is greater than that of the foam, and
wherein at least a part of the conductive material passes through interfaces between the non-porous region and the porous region or is dispersed in the non-porous region, and a ratio of the at least a part of the conductive materials passing through the interfaces between the non-porous region and the porous region or dispersed in the non-porous region to a total amount of the conductive materials in the foam is greater than or equal to 50 wt %,
wherein the conductive material is 1 to 10 wt % of a total amount of the foam, and
wherein the conductive material includes carbon nano tubes (CNT), and the CNTs is 0.05 to 3 wt % of the total amount of the conductive material.

2. The pressure sensor of claim 1, wherein the at least a part of the conductive material is dispersed in the porous region.

3. The pressure sensor of claim 1, wherein a ratio of a volume the porous region in the foam to a total volume of the foam is in a range of 5 to 90%.

4. The pressure sensor of claim 1, wherein the resistance of the intermediate layer is changed according to a change of at least one of a thickness or a volume of the intermediate layer.

5. The pressure sensor of claim 1, wherein the foam is selected from the group consisting of polyurethane, polyolefin, rubber, silicone, and elastomer.

6. The pressure sensor of claim 1, wherein the conductive material further includes at least one of Au, Ag, Cu, Ni, carbon black, graphene, a ceramic material, or a conductive polymer.

7. The pressure sensor of claim 1, wherein a distance between the first electrode layer and the second electrode layer is shortened when a pressure is applied on the first electrode layer, the intermediate layer and the second electrode layer.

8. The pressure sensor of claim 1, wherein a density of the conductive material per unit volume is increased when a pressure is applied on the first electrode layer, the intermediate layer and the second electrode layer.

9. The pressure sensor of claim 1, wherein a distance between the conductive material is shortened when a pressure is applied on the first electrode layer, the intermediate layer and the second electrode layer.

10. The pressure sensor of claim 1, wherein the first electrode layer includes a first conductive region that extends in a first horizontal direction, and the second electrode layer includes a second conductive region that extends in a second horizontal direction intersecting the first horizontal direction.

11. The pressure sensor of claim 10, wherein the first electrode layer includes a plurality of the first conductive regions that extend in the first direction and are spaced apart from each other, and the second electrode layer includes a plurality of the second conductive regions that extend in the second direction and are spaced apart from each other.

12. The pressure sensor of claim 10, wherein the first conductive region is larger than the second conductive region.

13. A pressure sensor comprising:
a first electrode layer including a first conductive region;

a second electrode layer including a second conductive region and positioned to be horizontally spaced apart from the first electrode layer;

an intermediate layer, the first electrode layer and the second electrode layer being coupled to a common surface of the intermediate layer; and an insulating adhesive layer provided between the intermediate layer and each of the first electrode layer and the second electrode layer, wherein the intermediate layer includes a foam in which a porous region is provided in a non-porous region, and a conductive material dispersed in the foam and having a conductivity that is greater than that of the foam, wherein at least a part of the conductive material passes through an interface between the non-porous region and the porous region or is dispersed in the non-porous region, wherein a surface area of the first electrode layer is greater than a surface area of the second electrode layer, and an area of a first region of the insulating adhesive layer between the first electrode layer and the intermediate layer is greater than an area of a second region of the insulating adhesive layer between the second electrode layer and the intermediate layer.

14. A pressure sensing device comprising:

a pressure sensor;

a signal processing unit connected with the pressure sensor and configured to process electric signals from the pressure sensor; and a control unit connected with the signal processing unit and configured to generate a control signal based on the signals processed by the signal processing unit, wherein the pressure sensor includes:

a first electrode layer;

a second electrode layer provided above the first electrode layer; and an intermediate layer disposed between the first electrode layer and the second electrode layer, wherein the first electrode layer is larger than the second electrode layer: wherein the intermediate layer includes a foam in which a porous region is dispersed in a non-porous region, and a conductive material is dispersed in the foam and has a conductivity that is greater than that of the foam, and wherein at least a part of the conductive material passes through interfaces between the non-porous region and the porous region or is dispersed in the non-porous region, and a ratio of the at least a part of the conductive materials passing through the interfaces between the non-porous region and the porous region or dispersed in the non-porous region to a total amount of the conductive materials in the foam is greater than or equal to 50 wt %, wherein the conductive material is 1 to 10 wt % of a total amount of the foam, and wherein the conductive material includes carbon nano tubes (CNT), and the CNTs is 0.05 to 3 wt % of the total amount of the conductive material.

15. The pressure sensing device of claim 14, wherein the control unit is further to:

determine a change in a resistance of the intermediate layer based on processing signals from the first electrode layer and the second electrode layer by the signal processing unit, determine on a weight of the user based on the change in the resistance of the intermediate layer, and generate the control signal based on the weight of the user.

16. The pressure sensing device of claim 15, wherein the control unit is further to:

generate, as the control signal, an instruction for an appliance to at least one of enter a locked state or output an alarm when the weight of the user is less than a threshold weight.

17. The pressure sensing device of claim 15, wherein the pressure sensor is included in a mat positioned in front of an appliance.

18. The pressure sensing device of claim 14, further comprising a communication unit to forward the control signal to another device.

19. The pressure sensor of claim 14, wherein the first electrode layer includes a first conductive region, and the second electrode layer includes a plurality of second conductive regions that are spaced apart from each other and are positioned over the first conductive region.

20. The pressure sensor of claim 14, wherein the first electrode layer includes a first conductive region that extends in a first horizontal direction, and the second electrode layer includes a second conductive region that extends in a second horizontal direction intersecting the first horizontal direction, and wherein the first conductive region is larger than the second conductive region.

* * * * *